(12) United States Patent
Lin et al.

(10) Patent No.: US 9,244,708 B2
(45) Date of Patent: *Jan. 26, 2016

(54) ENHANCED JAVA ARRAY

(71) Applicant: International Business Machines Corporation, Armonk, NY (US)

(72) Inventors: Angela Lin, Ontario (CA); Ryan A. Sciampacone, Ontario (CA); Vijay Sundaresan, Ontario (CA); Karl M. Taylor, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,427

(22) Filed: Aug. 29, 2014

(65) Prior Publication Data

US 2015/0339139 A1 Nov. 26, 2015

Related U.S. Application Data

(63) Continuation of application No. 14/282,065, filed on May 20, 2014.

(51) Int. Cl.
| | | |
|---|---|---|
| G06F 9/44 | (2006.01) | |
| G06F 9/45 | (2006.01) | |
| G06F 9/455 | (2006.01) | |
| G06F 9/445 | (2006.01) | |

(52) U.S. Cl.
CPC ............ *G06F 9/45516* (2013.01); *G06F 8/315* (2013.01); *G06F 9/44521* (2013.01); *G06F 9/45504* (2013.01)

(58) Field of Classification Search
CPC ............ G06F 12/0253; G06F 11/3466; G06F 11/3644; G06F 8/315; G06F 8/51; G06F 9/44521; G06F 9/4428; G06F 9/4433; G06F 9/45516; G06F 9/44504
See application file for complete search history.

(56) References Cited

U.S. PATENT DOCUMENTS

| | | | |
|---|---|---|---|
| 6,202,208 B1 * | 3/2001 | Holiday, Jr. ............... | G06F 8/67 707/999.103 |
| 6,314,429 B1 | 11/2001 | Simser | |
| 6,675,379 B1 * | 1/2004 | Kolodner et al. ............. | 717/130 |
| 6,996,824 B2 | 2/2006 | Sokolov | |
| 8,006,250 B1 * | 8/2011 | Lue-Sang ................. | G06F 8/24 707/999.103 |
| 8,397,227 B2 | 3/2013 | Fan et al. | |

(Continued)

OTHER PUBLICATIONS

Factor et al., Instrumentation of Standard Libraries in Object-Oriented Languages: the Twin Class Hierarchy Approach, 2004, 13 pages.*

(Continued)

*Primary Examiner* — Thuy Dao
(74) *Attorney, Agent, or Firm* — Erik Johnson; Damion Josephs

(57) ABSTRACT

A method for creating an enhanced array is provided. An enhanced compiler generates an instrumented class file for an enhanced array class. The enhanced array class comprises at least one element class. The enhanced runtime loads the instrumented class file of the enhanced array class. The enhanced runtime loads a class file corresponding to the element class of the enhanced array class, and builds an internal data structure corresponding to the enhanced array class. An amount of memory storage is calculated for storing the enhanced array instance, and the amount of memory storage is allocated.

5 Claims, 6 Drawing Sheets

(56) References Cited

U.S. PATENT DOCUMENTS

| | | | |
|---|---|---|---|
| 8,904,347 B2* | 12/2014 | Miloushev | G06F 8/24 |
| | | | 717/105 |
| 8,930,888 B2* | 1/2015 | Canches | G06F 8/315 |
| | | | 705/22 |
| 9,116,798 B2* | 8/2015 | Daynes | G06F 9/44521 |
| 2003/0101438 A1 | 5/2003 | Mishra et al. | |
| 2004/0133882 A1* | 7/2004 | Angel et al. | 717/130 |
| 2006/0242635 A1 | 10/2006 | Broussard et al. | |
| 2013/0007721 A1 | 1/2013 | Slavin et al. | |
| 2013/0086569 A1 | 4/2013 | Chapman et al. | |
| 2013/0152064 A1* | 6/2013 | Gagliardi | G06F 9/44521 |
| | | | 717/166 |
| 2013/0268921 A1 | 10/2013 | Brauneis et al. | |

OTHER PUBLICATIONS

Bentley et al., Implicit array bounds checking on 64-bit architectures, Dec. 2006, 26 pages.*

IBM: List of IBM Patents or Patent Applications Treated As Related (Appendix P).

Disclosed Anonymously, "Delayed Creation of Complex Arrays in Java", IP.com No. IPCOM000214203D, Jan. 17, 2012.

Grace Period Disclosure "IBM 31-bit SDK for z/OS, Java Technology Edition, Version 7 Release 1 delivers platform support", IBM United States Software Announcement 213-497, dated Dec. 10, 2013, pp. 1-16.

Pending U.S. Appl. No. 14/282,065, entitled "Enhanced java array", filed May 20, 2014.

Rose, Arrays [2.0 64 ] —opportunities and challenges, Oracle Corporation, Da Vinci Machine Project, JSR 292 Lead, 2012, 32 pages.

"Java Array", http://admashmc.com/main/images/Lec_Notes/javaarray.pdf, Admas University College, Jan. 30, 2007, pp. 1-29.

IBM, IBM 31-bit SDK for z/OS, Java Technology Edition, Version 7 Release 1 delivers new platform support, IBM United States Software Announcement 213-497, Dec. 10, 2013, pp. 1-16.

* cited by examiner

ENHANCED JAVA ARRAY

CROSS REFERENCE

The present application is a continuation of and claims priority under 35 U.S.C. §120 of U.S. patent application Ser. No. 14/282,065, filed on May 20, 2014, which is incorporated by reference in its entirety.

FIELD OF THE INVENTION

This disclosure relates generally to data structures used with programming language objects in a data processing system and more specifically to creating an enhanced Java® array in a program in the data processing system.

BACKGROUND

Most high-level programming languages, such as C and C++, provide a construct, called an array, which consists of a fixed number of memory locations of a single data type, for example, integers. Each memory location, or element of the array, is accessed by a numerical index representing the element's relative position in the array. However, in the Java® programming language an array is an object, and the array elements each point to a separate object that contains the element data, rather than pointing to the element data directly. As a consequence of the Java® language architecture, arrays have limitations, particularly in inefficient storage usage and performance overhead, not inherent in other programming languages. Current attempts to improve the Java® array implementation include adding a wrapper class that references the Java® array. While this allows customizable behavior, such as user-defined methods, the inefficient storage usage and performance issues remain. In another alternative, a custom application program interface (API) may be written to manipulate a raw byte buffer, thus simulating an array of data elements. However, memory usage and performance issues persist, since the objects created in this way are not entitled for the garbage collection process provided by the programming language.

As previously stated, working within the present Java® language to implement more robust array management features may have, as a consequence, performance implications. As such, it may be advantageous, among other things, to implement an enhanced Java® array as a Java® class, thus allowing the enhanced Java® array the behavior and features inherent in the Java® class generally, and thus enabling greater flexibility when working with memory structures while maintaining an encapsulated design.

Java and all Java-based trademarks and logos are trademarks or registered trademarks of Oracle and/or its affiliates.

SUMMARY

According to one embodiment, a method for creating an enhanced array comprises: generating, by an enhanced compiler, an instrumented class file for an enhanced array class, whereby the enhanced array class comprises at least one element class; loading, by an enhanced runtime, the instrumented class file, whereby the instrumented class file corresponds to the enhanced array class; loading, by the enhanced runtime, a class file corresponding to the at least one element class of the enhanced array class; building, by the enhanced runtime, an internal data structure corresponding to the enhanced array class; calculating, by the enhanced runtime, an amount of memory storage required to store an instance of the enhanced array class; and allocating, by the enhanced runtime, the calculated amount of memory storage required to store the instance of the enhanced array class.

According to another embodiment, a computer program product for creating an enhanced array comprises: a computer readable storage medium readable by a processing circuit and storing instructions for execution by the processing circuit for performing a method comprising: generating, by an enhanced compiler, an instrumented class file for an enhanced array class, whereby the enhanced array class comprises at least one element class; loading, by an enhanced runtime, the instrumented class file, whereby the instrumented class file corresponds to the enhanced array class; loading, by the enhanced runtime, a class file corresponding to the at least one element class of the enhanced array class; building, by the enhanced runtime, an internal data structure corresponding to the enhanced array class; calculating, by the enhanced runtime, an amount of memory storage required to store an instance of the enhanced array class; and allocating, by the enhanced runtime, the calculated amount of memory storage required to store the instance of the enhanced array class.

According to another embodiment, a computer system for creating an enhanced array comprising one or more processors, one or more computer-readable storage devices, and a plurality of program instructions stored on at least one of the one or more storage devices for execution by at least one of the one or more processors, the plurality of program instructions comprises: a computer readable storage medium readable by a processing circuit and storing instructions for execution by the processing circuit for performing a method comprising: generating, by an enhanced compiler, an instrumented class file for an enhanced array class, whereby the enhanced array class comprises at least one element class; loading, by an enhanced runtime, the instrumented class file, whereby the instrumented class file corresponds to the enhanced array class; loading, by the enhanced runtime, a class file corresponding to the at least one element class of the enhanced array class; building, by the enhanced runtime, an internal data structure corresponding to the enhanced array class; calculating, by the enhanced runtime, an amount of memory storage required to store an instance of the enhanced array class; and allocating, by the enhanced runtime, the calculated amount of memory storage required to store an instance of the enhanced array class.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure relates generally to field of data structures used with programming languages, and more particularly to creating an enhanced Java® array in a program in a data processing system. Java and all Java-based trademarks and logos are trademarks or registered trademarks of Oracle and/or its affiliates. The following described exemplary embodiments provide a system, method and program product to provide an enhanced Java array that would: support array-like operations; customizable behavior (i.e., user-defined methods); Java-centric declarations; and elements of complex types.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

Figure 1:
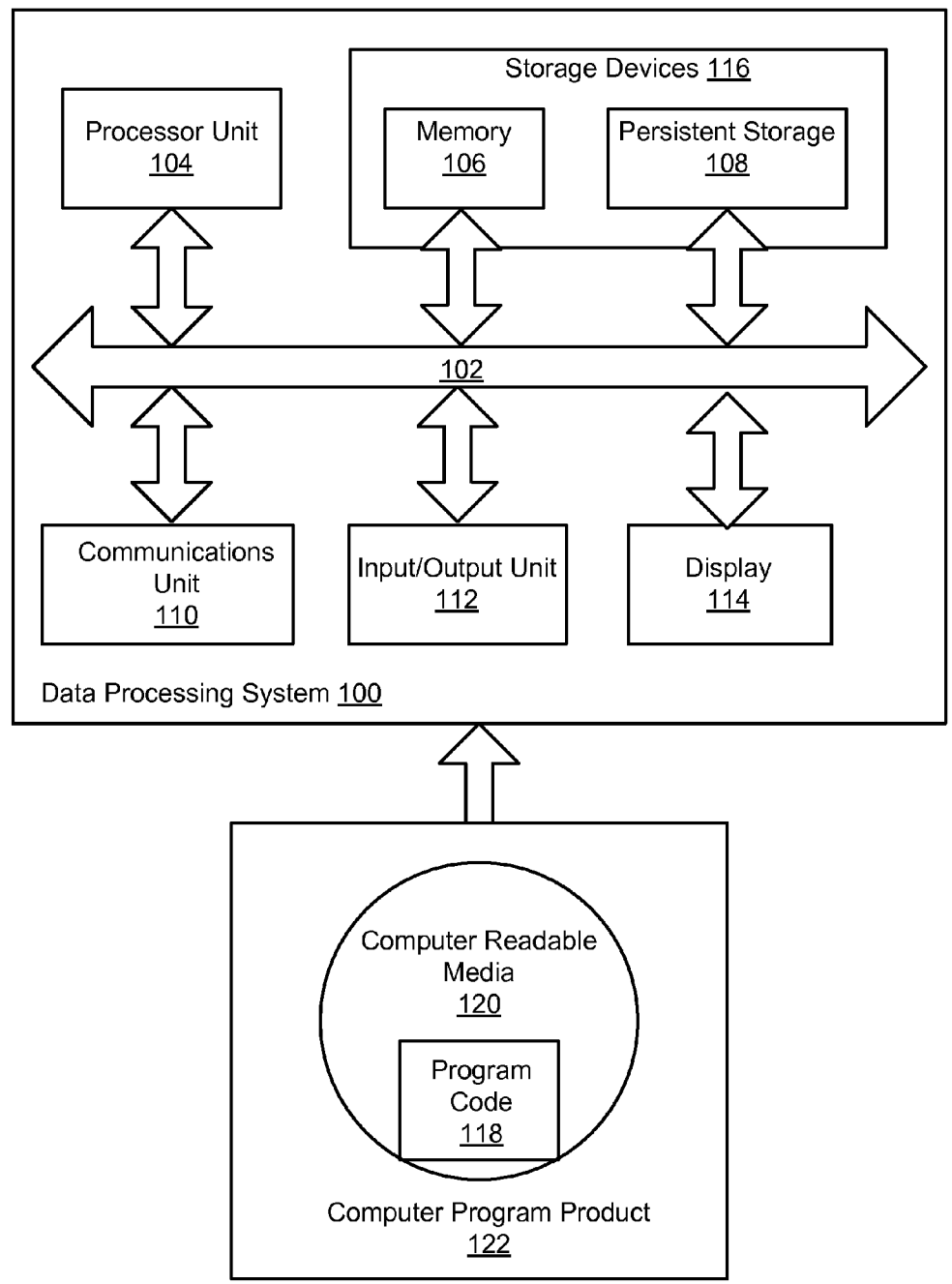
FIG. 1 is a block diagram of an exemplary data processing system operable for various embodiments of the disclosure.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a way to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a Java program object instantiated as an instance of a Java class inherits the intrinsic behaviors and features of the Java class implementation. In object-oriented programming, instantiation refers to the creation of an actual instance, i.e., an object, using the class's template. Memory is allocated for the object, and the object receives its own copy of any instance variables. Using the data processing system 100 of FIG. 1 as an example, an illustrative embodiment provides the computer-implemented process stored in memory 106, executed by the processor unit 104, for creating enhanced Java arrays. The processor unit 104 executes the computer-implemented process to provide instrumentation to an enhanced runtime using an enhanced compiler for a computer executable program portion. Generally, instrumentation is the process of injecting code into a compiled program. In Java, instrumentation may include the addition of functionality to a program by modifying the bytecode (i.e., the output of the Java compiler) of one or more Java classes. The processor unit 104 further detects a special class in the computer executable program portion using the enhanced runtime. The processor unit 104 instantiates the enhanced Java array with intrinsic behaviors and features inherent in a Java class implementation.

In an alternative embodiment, program code 118 containing the computer-implemented process may be stored within computer readable media 120 as computer program product 122. In another illustrative embodiment, the process for enhanced Java array creation may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process of enhanced Java array creation.

Figure 2:
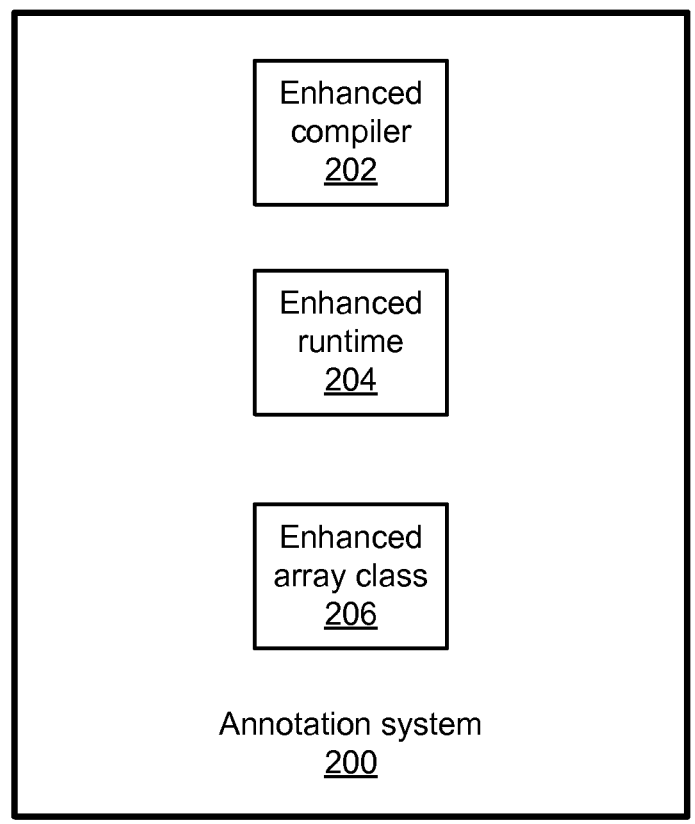
FIG. 2 is a block diagram of an annotation system, in accordance with various embodiments of the disclosure.

With reference to FIG. 2, a block diagram of an annotation system, in accordance with various embodiments of the disclosure is presented. Annotation system 200 is an example of a portion of a data processing system for creating enhanced Java array instances, such as data processing system 100 of FIG. 1, having the annotation system incorporated within.

The annotation system 200, in the illustrative embodiment, includes a number of components, leveraging support of an underlying data processing system, comprising an enhanced compiler 202, an enhanced runtime 204, provided as an enhanced Java virtual machine (JVM), and an enhanced Java array class 206.

The enhanced Java array class 206 is a Java class comprising intrinsic behaviors and features of the Java class implementation. In the Java programming language, a class represents a blueprint definition from which individual objects may be created. Therefore, the enhanced Java array class may include class variables, instance variables, local variables, parameters, user-defined methods, inherited states and behaviors, and interfaces, among other things. The illustrative embodiment may be implemented using a Java programming language example, but the concepts presented may apply to other object oriented programming languages as well.

The enhanced compiler 202 provides a capability to generate an annotated Java class definition and subsequently add instrumentation to the resultant Java class file (i.e., the output of a Java compiler) to indicate that an enhanced Java array class, in the form of a Java class, along with the intrinsic behaviors and features of the Java class implementation, is defined. The enhanced Java array class may therefore be defined using standard Java language semantics, annotated by the enhanced compiler 202, and instantiated by the enhanced runtime 204. However, where an enhanced runtime 204 is not provided, the instrumented Java class file may still be supported in a less optimal fashion, with respect to memory usage and performance.

The enhanced runtime 204 recognizes the Java array class instrumentation provided by the enhanced compiler 202 and provides the intrinsic Java class operations. For example, the enhanced runtime provides capabilities to instantiate the enhanced Java array and access its elements.

An enhanced Java array class may be defined using the @ArrayClass annotation, and instrumented by the enhanced compiler 202 of the annotation system 200 of FIG. 2. For example, consider the following Java class definition:

```
class Element {
    int field 1;
    int field 2;
    Element (int field1, int field2) {
        this.field1=field1;
        this.field2=field2;
    }
}
```

The corresponding enhanced Java array class may be generated by the enhanced compiler 202 of the annotation system 200, both of FIG. 2, as follows:

```
@ArrayClass(type=Element.class)
class ElementArray implements Serializable, Cloneable {
    private ElementArray( ){ }
    public final static ElementArray allocate(int length) {
        return ArrayClassInternals.newInstance(ElementAr-
            ray.class, length);
    }
    public final int getLength( ){
        return ArrayClassInternals.getLength(this);
    }
    public final Element at(int index) {
        return ArrayClassInternals.at(this, index);
    }
    public final void put(int index, Element value) {
        return ArrayClassInternals.put(this, index, value);
    }
    // user defined methods may be added
    void userDefinedMethod( ){
        // actions of the method
    }
}
```

Additionally, when the enhanced Java array class, shown in the above example as ElementArray, is generated by the enhanced compiler 202 of the annotation system 200 of FIG. 2, the user may extend the generated Java class by defining custom methods, such as shown as userDefinedMethod( ) in the above example.

Standard array-like operations on an instance of an enhanced Java array class, such as ElementArray, may be implemented in a helper class by an enhanced runtime 204 of the annotation system 200 of FIG. 2. For example, ArrayClassInternals provides the following methods to create the class instance, get the length of the array, retrieve an array element, and set the value of an array element:

```
public final class ArrayClassInternals {
    public static native <T> T newInstance(Class<T>, int
        length);
    public static native int getLength(Object array);
    public static native Object at(Object array, int index);
    public static native void put(Object array, int index,
        Object value);
}
```

Subsequently, the ArrayClassInternals may be used to express operations involving an enhanced Java array class, such as ElementArray, in standard Java language code as follows:

```
// instantiate an ElementArray
ElementArray array=ElementArray.allocate(10);
// assign the value of an element of the ElementArray
    instance
Element e=new Element(0);
array.put(0, e);
// retrieve an element of the ElementArray instance
e=array.at(0);
// call user-defined method
array.userDefinedMethod( );
```

The methods of ArrayClassInternals may be implemented, for example, in standard Java language code. Another example implementation may use the Java Native Interface (JNI), which is an application program interface (API) that enables Java code in a JVM to interface with a non-Java environment. However, this implementation requires knowledge of the internal virtual machine representation of the enhanced Java array class and its instance(s). For Just-In-Time (JIT) compiled Java code, when the type of the enhanced Java array instance can be determined at compile time, the JIT can generate optimized code that is specific to the type of the enhanced Java array instance. JIT compilation is translation of Java bytecode into machine code that is done during the execution of a program, i.e., at run time, rather than prior to execution. Another alternative includes using the sun.misc.Unsafe API, which provides functions to directly read and write to arbitrary memory locations. However, this alternative circumvents published Java language and API specifications.

In operation, during class loading the enhanced runtime 204 of FIG. 2 (i.e., the JVM) recognizes the @ArrayClass annotation. The enhanced Java array class (i.e., ElementArray) is associated with the class of the array's elements (i.e., Element). The enhanced runtime 204 of FIG. 2 also ensures the class of the array's elements (i.e., Element) is loaded. However, in other respects, such as method table building, and inheriting methods from superclasses and interfaces, the enhanced Java array class inherits the intrinsic behaviors and features of the Java class implementation.

Figure 3A:
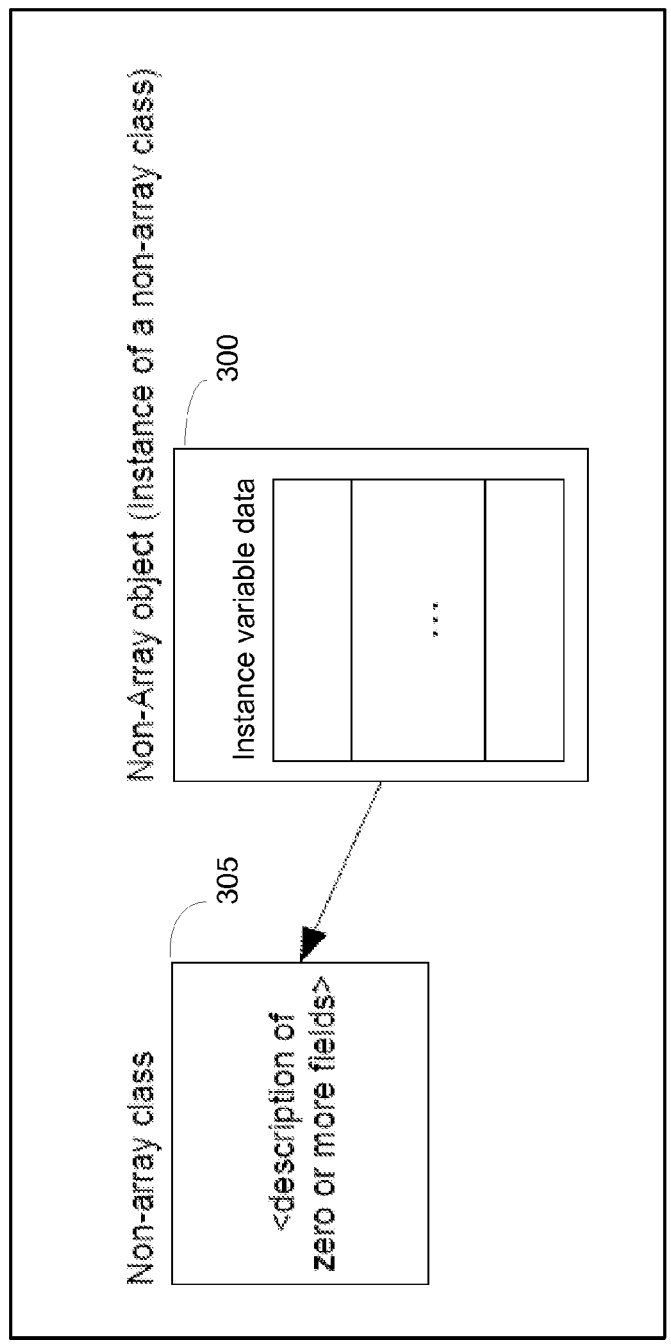
FIG. 3A is a tabular representation of the relationship between the entities that represent a non-array object.
Figure 3B:
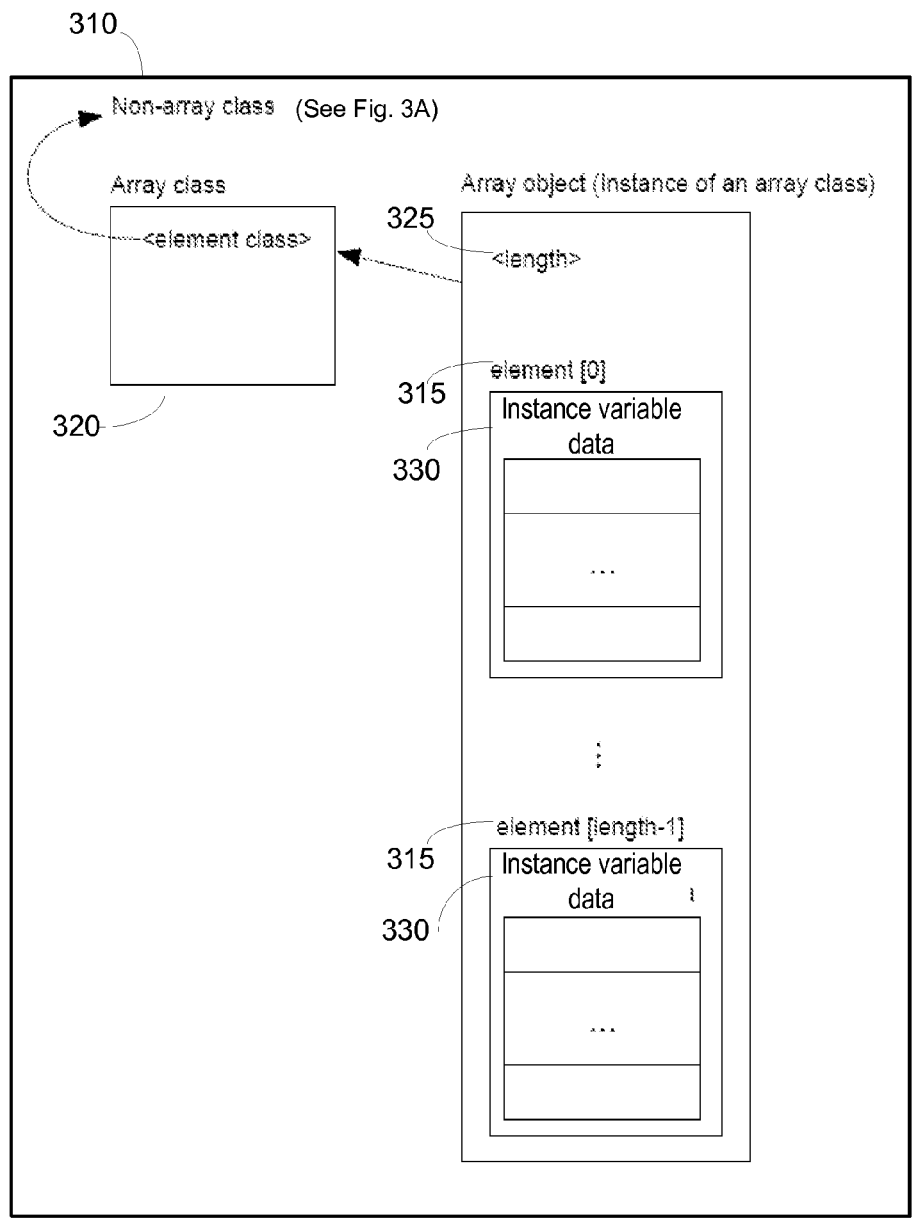
FIG. 3B is a tabular representation of the relationship between the entities that represent an array object, in accordance with one embodiment of the disclosure.

In the absence of the @ArrayClass annotation, a typical Java class is instantiated as a singleton object, for example 300 (FIG. 3A), which is a single entity that comprises storage for a single copy of each instance variable declared in the Java class definition 305 (FIG. 3A). In contrast, when an enhanced Java array class is instantiated, the @ArrayClass annotation directs the enhanced runtime 204 of FIG. 2 (JVM) to instantiate it as an array object of its element class, which we will hereafter refer to as simply an array object. In the example depicted in 310 (FIG. 3B), an array object differs from a non-array object in that the array object comprises zero or more element entities 315 (FIG. 3B), where each element is an instance of the array object's element class 320 (FIG. 3B). The array object has a length 325 (FIG. 3B), which is an integral (i.e., an integer) value greater than or equal to zero that specifies the number of elements. Also, the array object comprises storage for length copies of each instance variable 330 (FIG. 3B) declared in its elements' class definition. Each element is accessed using a numerical index. The enhanced runtime 204 of FIG. 2 (JVM) uses the information associated with the class of the enhanced array class's elements, particularly the size of an instance of the element class, to allocate the enhanced array instance's data. The garbage collection process also uses the array length and element size information to correctly manage the memory of the enhanced array.

The location and layout of the enhanced array instance's data is governed by the implementation of the ArrayClassInternals helper class. If the enhanced runtime also supports a mechanism for optimizing the memory layout of class instances, the mechanism can be used to optimize the memory layout of the enhanced array instance. There are many possible mechanisms for optimizing the memory layout of class instances, such as, for example, a packed data object. The packed data object model differs from the standard Java data model, in several ways, but in general, data is stored in the minimum amount of space necessary.

Figure 4:
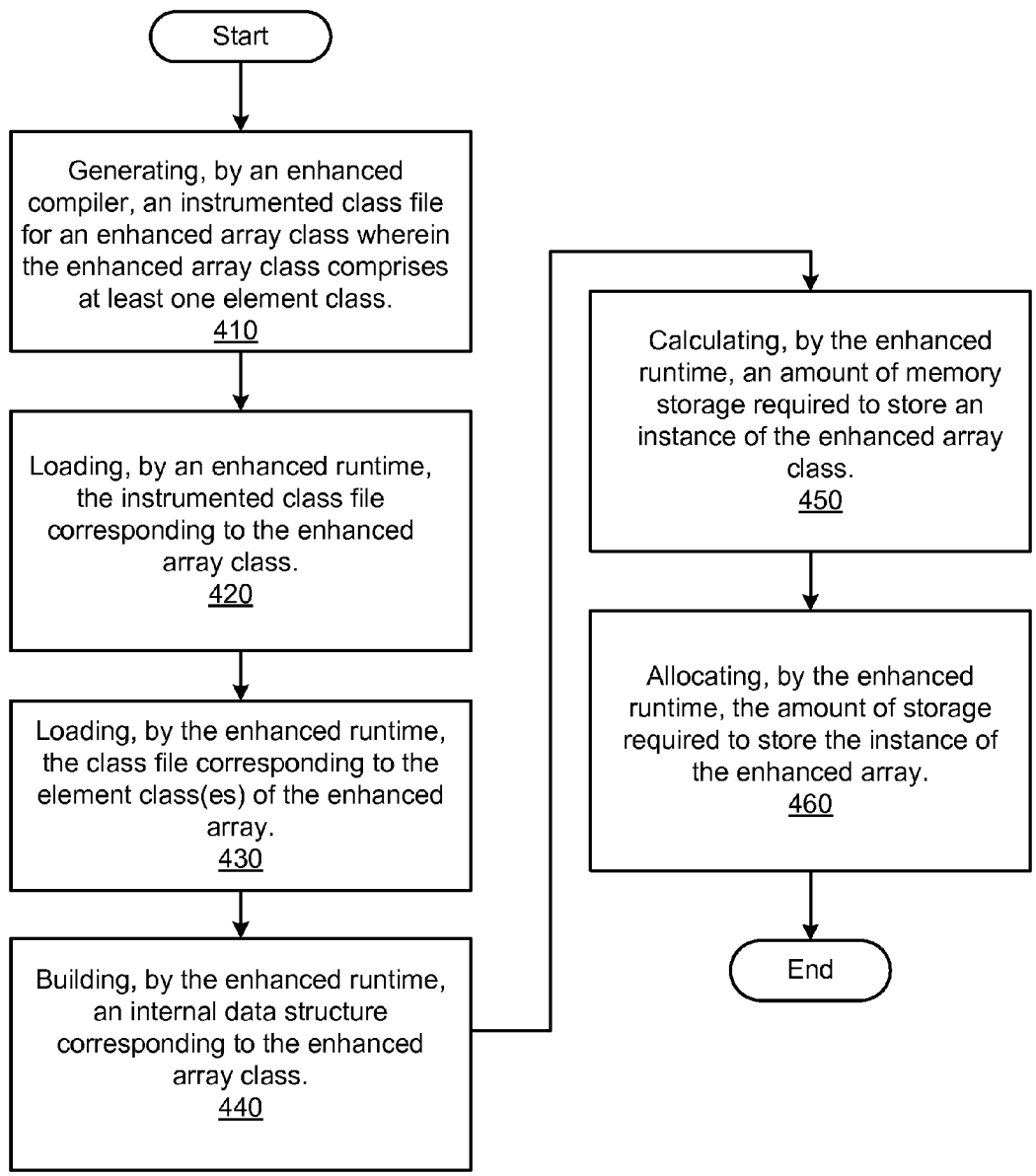
FIG. 4 is an exemplary process for creating an array class, using the annotation system of FIG. 2, in accordance with one embodiment of the disclosure.

With reference to FIG. 4, a process for creating an enhanced Java array, using the annotation system of FIG. 2, in accordance with one embodiment of the disclosure is presented.

At 410, an enhanced compiler generates an instrumented class file for an enhanced array class, which specifies its element class. Generating the instrumented class file further comprises receiving a source code file that is written in a programming language. At least one annotation is embedded in the class file generated from the programming language source code file, wherein an annotation comprises one or more directives that guide the execution of at least one of: an enhanced runtime; and the one or more helper libraries. For example, a directive @ArrayClass is used to inform the enhanced runtime of the special class, the enhanced Java array class.

At 420, the enhanced runtime loads the instrumented class file, generated in 410, corresponding to the enhanced array class. At 430, the enhanced runtime loads the class file corresponding to the class of the elements of the enhanced array.

At 440, the enhanced runtime builds an internal data structure corresponding to the enhanced array class.

At 450, the enhanced runtime calculates the amount of memory storage required for the enhanced array instance. Calculating the amount of memory storage further comprises multiplying a size of the data element of the enhanced array by a number of elements to be stored in the array. The size of metadata, used by the enhanced runtime to manage the array data is added to the calculated size of the array data element storage. The term, metadata, is implementation-specific. However, generally in this context, metadata refers to data used by the enhanced runtime, i.e., the JVM, to manage the array data. An amount of additional storage is then added, as required by the runtime. At 460, the enhanced runtime allocates the amount of memory, calculated at 450.

Thus in one illustrative embodiment, a computer-implemented process creates an enhanced array. The computer-implemented process generates an instrumented class file for an enhanced array, loads the instrumented class file that corresponds to the enhanced array class, loads the class file corresponding to the element class of the enhanced array. The computer-implemented process builds an internal data structure corresponding to the enhanced array class, calculates an amount of memory storage required to store an instance of the enhanced array class, and allocates the calculated amount of memory for the instance of the enhanced array class. The amount of memory is calculated as the size of an element of the array multiplied by a number of elements in the array, plus the total size of metadata and additional storage required by the runtime.

Figure 5:
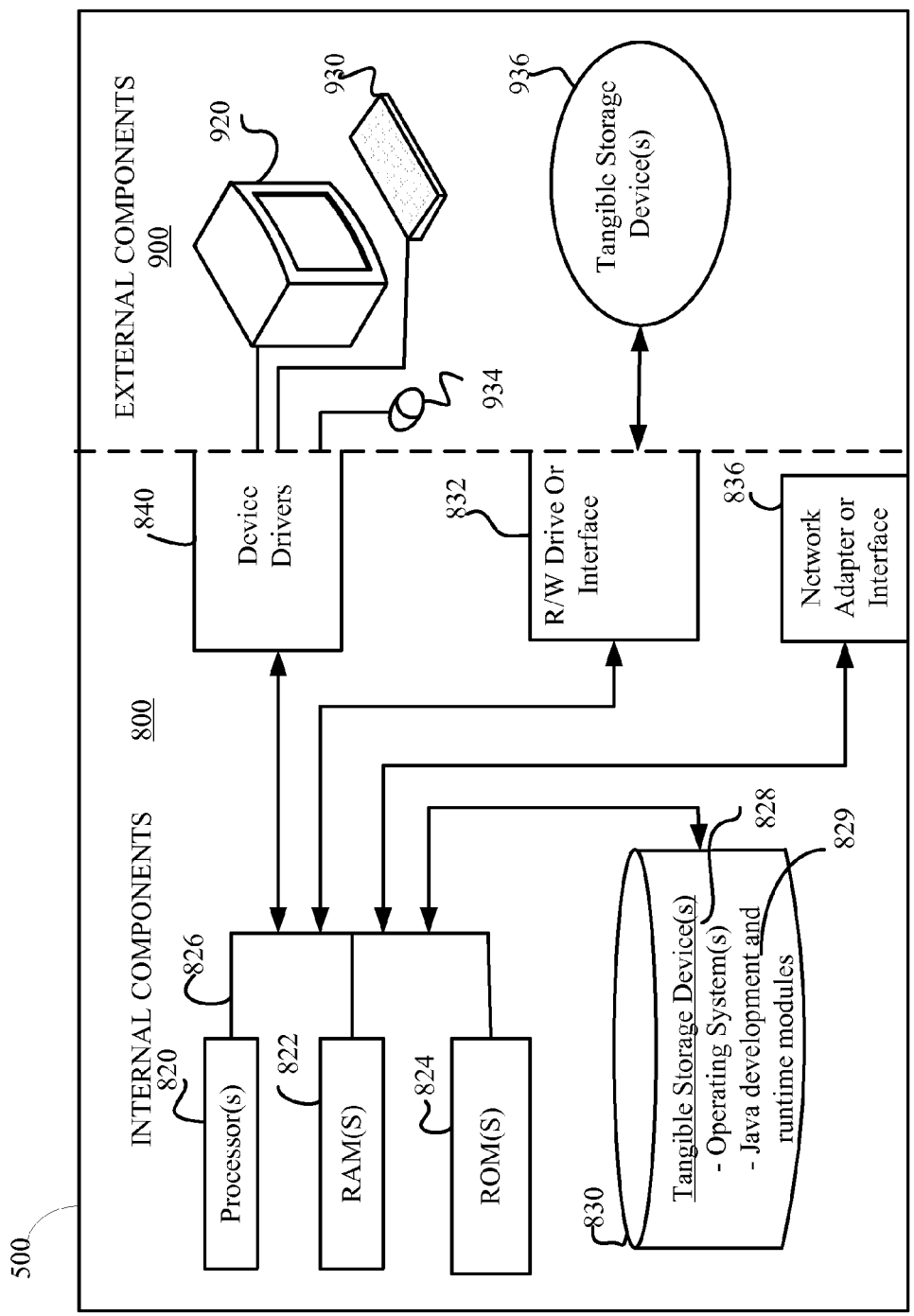
FIG. 5 is a schematic block diagram of hardware and software of the computer environment according to an embodiment of the process of FIG. 4.

Referring now to FIG. 5, computing device 500 may include respective sets of internal components 800 and external components 900 that together may provide an environment for a software application, such as a database management system (DBMS). Each of the sets of internal components 800 includes one or more processors 820; one or more computer-readable RAMs 822; one or more computer-readable ROMs 824 on one or more buses 826; one or more operating systems 828; one or more software applications (e.g., Java development and runtime modules 829) executing the method 600; and one or more computer-readable tangible storage devices 830. The one or more operating systems 828 and Java development and runtime modules 829 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS modules 829, and operating system 828 that are associated with computing device 500, can be downloaded to computing device 500 from an external computer (e.g., server) via a network (for example, the Internet, a local area network, or other wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Various embodiments of the invention may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A method for creating an enhanced array comprising:
   generating, by an enhanced compiler, an instrumented class file for an enhanced array class, wherein the enhanced array class comprises at least one element class;
   loading, by an enhanced runtime, the instrumented class file, wherein the instrumented class file corresponds to the enhanced array class;
   loading, by the enhanced runtime, a class file corresponding to the at least one element class of the enhanced array class;
   building, by the enhanced runtime, an internal data structure corresponding to the enhanced array class, wherein each element of the internal data structure corresponds to an instance of the element class of the enhanced array class;
   calculating, by the enhanced runtime, an amount of memory storage required to store an instance of the enhanced array class, wherein calculating the amount of memory storage required to store the enhanced array comprises:
  multiplying a size of the data element of the enhanced array by a number of data elements to be stored in the enhanced array;
  adding a total size of metadata; and
  adding an amount of additional storage as required by the runtime; and
allocating, by the enhanced runtime, the calculated amount of memory storage required to store the instance of the enhanced array class.

2. The method of claim 1, wherein the enhanced runtime comprises at least one of:
  an enhanced virtual machine, wherein based on the presence of the enhanced array class instrumentation, the enhanced virtual machine instantiates the enhanced array class as an array object; and
  one or more helper libraries, wherein the one or more helper libraries instantiate the enhanced array class as an array object, based on the presence of the enhanced array class instrumentation, and based on a virtual machine not being an enhanced virtual machine.

3. The method of claim 1, wherein a mechanism to instantiate the enhanced array class as the array object uses an optimal memory layout mechanism that is provided by an enhanced virtual machine.

4. The method of claim 1, wherein generating the instrumented class file comprises:
  receiving a programming language source code file;
  embedding at least one annotation in the class file generated from the programming language source code file, wherein an annotation comprises one or more directives that guide the execution of at least one of:
    the enhanced runtime; and
    the one or more helper libraries.

5. The method of claim 1, further comprising a virtual machine, wherein the virtual machine reclaims on-heap objects during garbage collection operations, based on an array length and element size of the enhanced array class; and
  optimized code sequences, generated by a Just-In-Time (JIT) compiler, for operations associated with enhanced arrays.

* * * * *